United States Patent [19]

Hough et al.

[11] 4,154,474
[45] May 15, 1979

[54] DETACHABLE SUNROOF FOR AUTOMOBILES

[75] Inventors: Louis E. Hough, St. Clair Shores; David C. Shifflett, Sterling Heights, both of Mich.

[73] Assignee: Empire Automotive, Inc., Roseville, Mich.

[21] Appl. No.: 851,973

[22] Filed: Nov. 16, 1977

[51] Int. Cl.$^2$ ............................................. B60J 7/18
[52] U.S. Cl. .................................. 296/137 B; 49/465
[58] Field of Search .............. 296/137 B; 49/465, 397; 16/181, 183, 149, 163; 292/DIG. 5

[56] References Cited

U.S. PATENT DOCUMENTS

| | | | |
|---|---|---|---|
| 3,974,753 | 8/1976 | Blomgren et al. | 49/397 |
| 4,067,605 | 1/1978 | Green et al. | 296/157 B |

*Primary Examiner*—Robert R. Song
*Attorney, Agent, or Firm*—Krass & Young

[57] ABSTRACT

A detachable sunroof panel is adapted to be secured within an opening formed in the roof of an automobile. The securement is carried out by a system of latches, all of which act on the panel to compress a resilient seal member extending about the periphery of the opening between the roof panel and a lip portion formed on a frame secured within the opening. The latch system includes a latch-handle mechanism located at the rear edge of the panel comprised of an overcenter linkage which may also be detached for removal of the sunroof panel. The latch-handle may be moved to a latched position, or to a second vent position allowing movement of the rear portion of the sunroof panel upwardly to create a vent opening. The latch system further includes a pair of latch-hinges located along the front edge of the panel, each of which also comprise a releasable overcenter linkage adapted to compress the peripheral seal in the secured or locked position and upon release allow detachment and removal of the sunroof panel. The hinging action required in the vent position of the panel is created while the latch-hinges are in the locked position by deflection of the frame lip and latch-hinges such that a biasing closing force is imposed on the sunroof panel in the vent position to tightly position the panel preventing rattle or loosening of the components.

9 Claims, 9 Drawing Figures

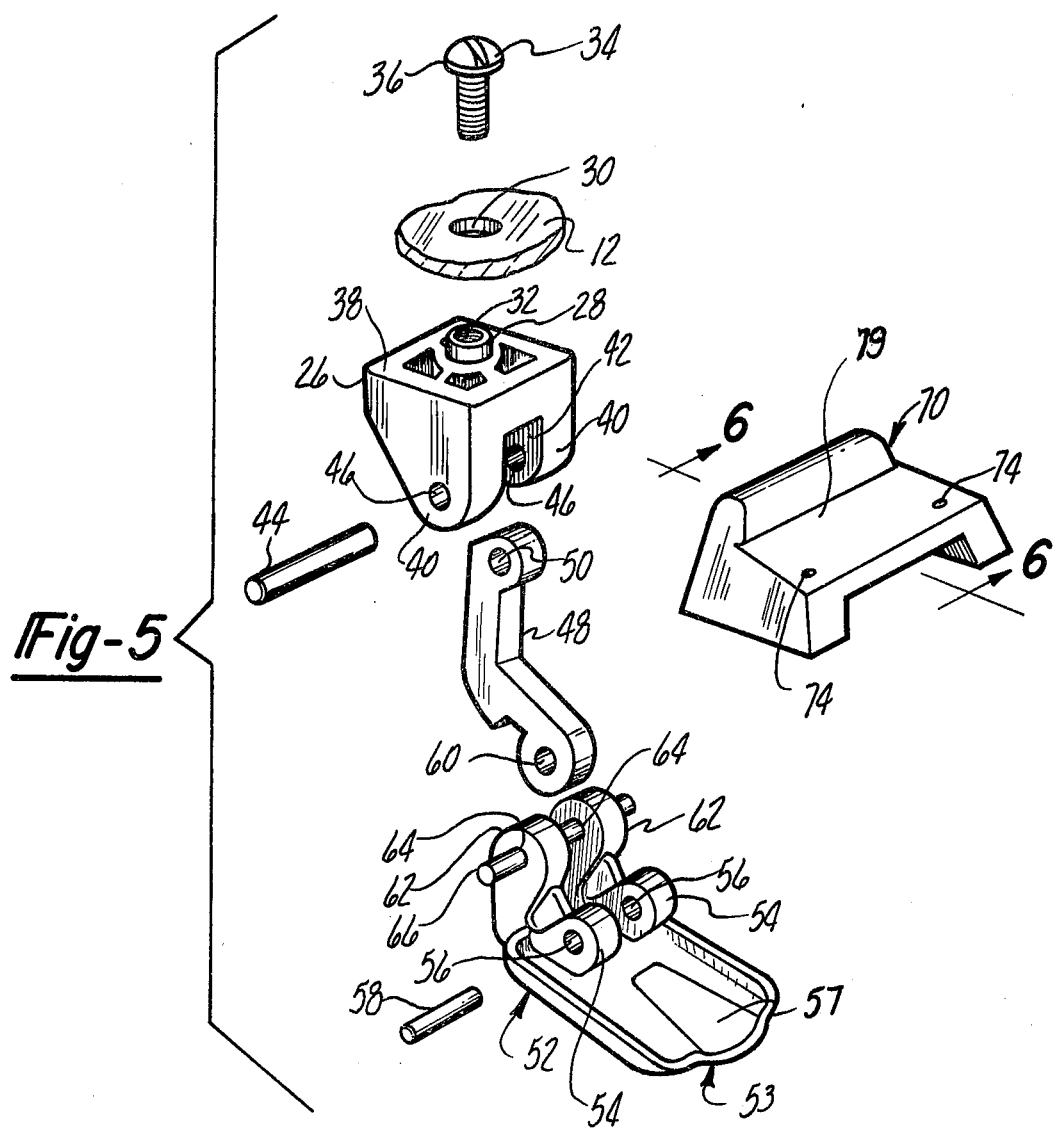
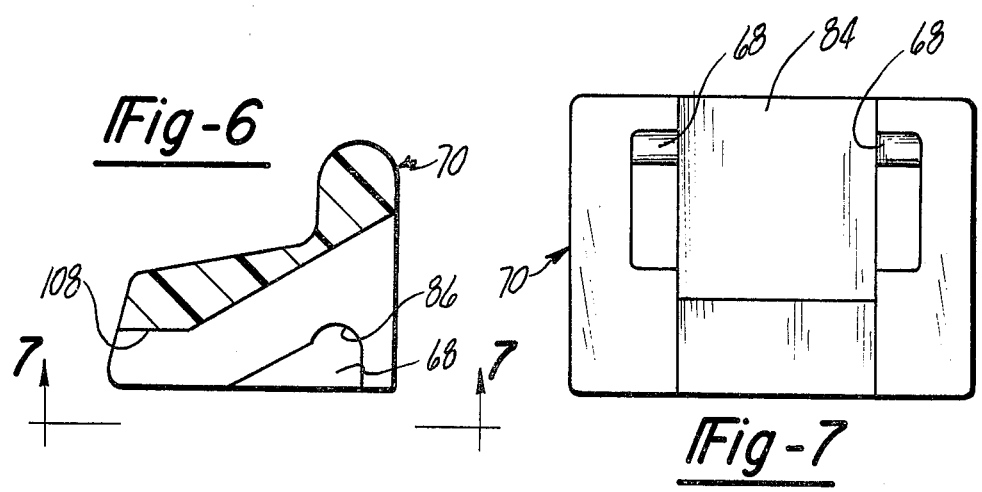

DETACHABLE SUNROOF FOR AUTOMOBILES

BACKGROUND DISCUSSION

This invention concerns sunroof panels of the type which comprise a transparent closure for an opening in the roof of an automobile. More particularly, this type of sunroof closure allows for a vented positioning of the sunroof panel in which the rear edge is tilted open and also may be completely removed from the opening in the automobile roof.

The recent popularity of sunroofs in automobiles has led to the development of numerous designs for the securement of the panel within the opening of the roof in such a manner as to allow the panel to be secured in the locked or closed position in sealing engagement with an opening seal and also in a vent or pop-up position in which the rear edge of the sunroof closure is open a few inches to allow some vent circulation to occur. These designs also provide for a complete detachment of the sunroof panel to leave the opening unobstructed. This arrangement typically is comprised of an overcenter linkage secured to the rear portion of the sunroof panel which cooperates with detachable hinging arrangement at the front portion of the sunroof panel. The rear latching arrangement allows the securement of the sunroof panel in sealing engagement with the closure seal in the closed position, positioning the rear edge a few inches open in the pop-up or vent position, and also has a detachability feature in order to afford complete removal of the sunroof panel. The front detachable hinges accommodate the tilting movement of the sunroof panel created by the movement of the rear latch to the pop-up position and also allow detachment of the sunroof panel.

An example of such a sunroof design is described in copending application, Ser. No. 583,260, assigned to the same assignee as the present application.

The usual approach for producing the detachable hinging of the forward edge of the panel is to provide bayonet projections cooperating with a corresponding opening formed in the frame which are configured to cooperate to produce a compression of the seal upon insertion of the bayonet into the opening and closure of the rear latch. The openings and projections also accommodate the hinging movement required when the latching handle is moved to the pop-open position. This depends on the camming geometry of the bayonet connection to produce compression of the seal. Handling of the panel during removal and storage can result in bending of the bayonet projections such as to result in insufficient compression of the front seal.

In the pop-open or vent position, there is a certain degree of looseness created by the hinging action produced by the bayonet connection which can produce some rattling due to road vibrations, or some slight movements of the closure panel itself may also occur.

It is accordingly an object of the present invention to provide a closure system for a sunroof panel which produces a secure compression of the seal by the sunroof panel which is not subject to loss of compression by bending of the various components.

It is another object of the present invention to provide such an arrangement in which very good compression of the seal is afforded about the entire periphery of the sunroof panel.

It is yet another object of the present invention to provide an arrangement whereby the sunroof panel is tightly positioned when the panel is in the pop-up or vent position.

SUMMARY OF THE INVENTION

These and other objects of the present invention, which will become apparent upon a reading of the following specification and claims, are accomplished by a latching system in which both the rear latch handle and the hinging securement of the sunroof panel are provided by overcenter linkages which produce good compression of the closure seal about its entire periphery. A conventional, two-position, detachable rear latch-handle mechanism is utilized in conjunction with a pair of latch-hinges secured to the front edge of the sunroof panel, each of which includes an overcenter linkage arrangement which is adapted to draw the panel down into sealing engagement with the seal. The hinging action is afforded by the deflection of a frame lip portion upon which rests the seal, and also latch-hinge components which deflection produces a resisting downward bias on the panel when the latch-handle is moved to the vent position to tightly position the sunroof panel in the vent position. The overcenter linkages of each latch-hinge are quickly releasable such as to allow detachment of the sunroof panel by merely flipping lever handles, swinging the same out from engagement with recesses formed in a pivot block which provide a pivot point for a pivot pin carried by the lever handle. The movement of the overtravel linkage is converted into a straight down pull on the sunroof panel by means of a pedestal block secured to the sunroof panel and engaging a lateral face on the pivot block which converts the linkage movement into a straight downward pull on the panel. The abutment of these faces also produces a lateral location of the sunroof panel within the roof opening. The configuration of the overtravel linkage is such that it limits relative rotation between the lever handle and an overcenter link so that the links cannot become mispositioned after release to insure proper orientation thereof upon re-engagement of the latch-hinges.

BRIEF DESCRIPTION OF THE DRAWINGS

FIG. 5 is an exploded perspective view of the components comprising the latch-hinge assembly.

FIG. 6 is a view of the section 6—6 taken through the pivot block shown in FIG. 5.

FIG. 7 is a view of the pivot block shown in FIG. 6 in the direction of the arrows 7—7 in FIG. 6.

DETAILED DESCRIPTION

In the following detailed description, certain specific terminology will be utilized for the sake of clarity and a specific embodiment described in accordance with the requirements of 35 USC 112, but it is to be understood that the same is not intended to be limiting and should not be so construed in a limiting sense inasmuch as the invention is capable of taking many forms and variations within the scope of the appended claims.

Figure 1:
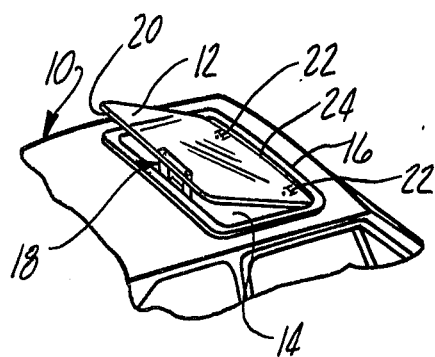
FIG. 1 is a fragmentary view of the roof portion of an automobile depicting a sunroof panel utilizing the securement system according to the present invention.

Referring to the drawings and particularly FIG. 1, the sunroof panel according to the present invention is intended to be installed in the roof 10 of an automobile generally located over the front seat of the passenger compartment in the conventional manner. The sunroof panel 12 comprises a sheet of tempered glass as described in the above referenced pending application, or alternatively may be formed of a transparent plastic material such as acrylic plastic. The panel 12 is disposed within an opening 14 formed in the roof 10 with a frame 16 secured to the automobile roof panel 10 about the periphery of the opening 14. The panel 12 is shaped generally rectangularly in correspondence to the shape of the opening 14 and the frame 16 such as to provide a closure therefor when the sunroof panel 12 is installed.

The sunroof panel 12 is adapted to either be positioned in a closed position providing a weather tight enclosure for the opening 14 or in a pop-open or venting position as shown in FIG. 1, or finally to be completely detached from the frame 16 and removed so as to leave the opening 14 completely unobstructed. This alternate positioning of the roof panel 12 is carried out by means of a latch-handle mechanism 18 secured at the rear edge 20 of the sunroof panel 12 and a pair of latching hinges 22 provided in spaced relationship at the frontal edge of the sunroof panel. The latching handle 18 is adapted to alternatively latch the rear edge 20 of the sunroof panel 12 in a closed position or upon partial release to force the rear edge 20 of the sunroof panel 12 ajar a matter of a few inches as shown, and finally to totally release the rear edge 20 at the same time as the latching hinges 22 are released to enable complete removal of the sunroof panel 12.

The latching hinges 22, as will be described hereinafter, do not hinge in the conventional sense but rather clamp the front edge 24 of the sunroof panel 12 to a seal disposed within the frame 16 and the hinging action is created by deflection of the frame 16 and the associated hinge components and the seal such that in the pop-open or vent position, there is a substantial closing bias force exerted on the panel 12 which serves to securely position the sunroof panel 12 in the pop-open or vent position to provide an anti-rattle, anti-jounce effect.

The latch-handle mechanism 18 is contemplated as being of the same design as that disclosed in the above-referenced copending application although any such latching mechanism allowing for the closed, pop-open and released positions could be used in combination with the latching hinges 22 according to the present invention.

Figure 2:
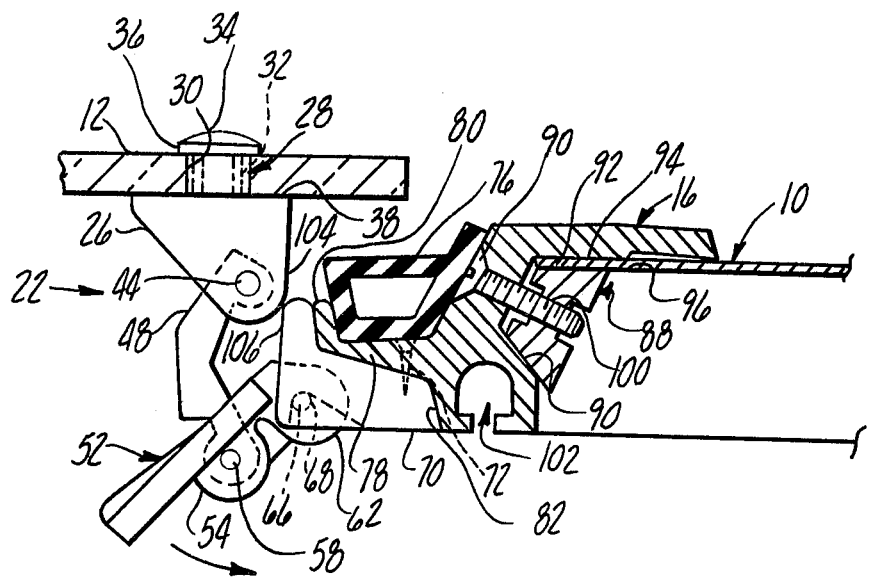
FIG. 2 is a sectional view of the front portion of the sunroof panel and associated framework depicting the latch-hinges as the sunroof panel is being installed.

One of the hinges 22 is shown in FIG. 2 in the position with the sunroof panel 12 being installed. Each latch hinge 22 includes a pedestal block 26 which is secured to the sunroof panel 12 by means of a boss portion 28 extending through a corresponding hole 30 formed in the sunroof panel 12. The boss, as well as the remainder of the pedestal block 26, is preferably formed of a hard rubber or molded plastic construction such as to cushion the connection with the tempered glass forming the sunroof panel 12. The interior of the boss portion 28 is provided with a molded metallic threaded insert 32 which acts to cooperate with a threaded fastener 34 threadably received into the threaded insert 32. A cushioning resilient washer 36 may be secured to the underface of the threaded fastener 34. The pedestal block 26 is provided with a base surface 38 such that upon drawing the threaded fastener 34 into engagement with the upper surface of the sunroof panel 12, the pedestal block 26 is securely mounted to the sunroof panel with the base surface 38 drawn into tight engagement with the underside of the sunroof panel 12. Each pedestal block 26 is also provided with a pair of spaced clevis ears 40 defining a recess 42 therebetween with a pivot pin 44 received in corresponding openings 46 formed in each of the clevis ears 40. This provides a pivotal support for an angle link 48 having an opening 50 formed in one end thereof through which passes the pivot pin 44. The angle link 48 is pivoted at its other end to a lever handle 52 by means of a pair of clevis ears 54 formed with a pair of openings 56 which receive a pin 58 extending therethrough which is received within an opening 60 formed in the opposite other end of the angle link 48 from the opening 50 such as to provide a means for pivotally connecting the angle link 48 to the lever handle 52. The angle link passes through an endwise slot 55 formed in the lever-handle 52 intermediate the clevis ears 54 and 62.

Spaced from the clevis ears 54 are a second set of clevis ears 62 which likewise have openings 64 formed therein to receive a pivot pin 66 which extends beyond the clevis ears 62. The projecting ends of the pivot pin 66 are adapted to be received within pivot catch recesses 68 (FIGS. 6 and 7) formed within a catch block 70. The catch block 70, as noted, is formed with a pair of pivot catch recesses 68 which extend from a central recess 84 formed in the catch block 70, the central recess 84 accommodating the clevis ears 62 when the pivot pin 66 is disposed with either projecting end within a corresponding recess 68. Each recess 68 is formed with an arcuate seat 86 such as to provide a pivot point for the ends of the pivot pin 66.

Catch block 70 is joined to the frame 16 by means of a pair of threaded fasteners 72 passing into holes 74 formed in upper surface of the catch block 70. This mounting is directly beneath the sunroof panel seal 76 which is disposed on a lip section 78 which projects from the frame member 16 into the opening 14 so as to provide a surface for receiving the seal 76. The upper surface 79 of the catch block 70 is configured in complementary fashion to the shape of the lower surface of the lip portion 78. Lip portion 78 is formed with upwardly projecting edge 80 to serve as a locator surface for proper positioning and confinement of the seal 76 on the upper surface of the lip 78. The catch block 70 also is in abutment with a downwardly extending surface 82 formed on the frame 16 such as to be securely located in abutment therein to provide a secure location of the catch block 70 by being secured to the frame 16.

The frame 16 which may be comprised of an aluminum extrusion is secured to the automobile roof 10 by means of an anchor bar 88 having inclined sides which cooperate with a corresponding inclined surface 90 formed on the frame 16; and trapping the roof edge 92 adjacent the opening 14 between another corresponding inclined surface 94 on the interior of the frame 16 and on the opposite side of the anchor bar 88. The anchor bar 88 is drawn in clamping engagement by means of countersunk machine screws 98 received within bores 100 formed centrally of the anchor bar 88. A recess 102 is provided for receiving a bead anchoring the headliner material within the interior of the vehicle, not shown herein. This recess 102 provides some degree of resiliency of the lip 78 to lateral bending as will be herein described in detail when the rear edge of the sunroof panel 12 is in the pop-up or vent position.

Figure 3:
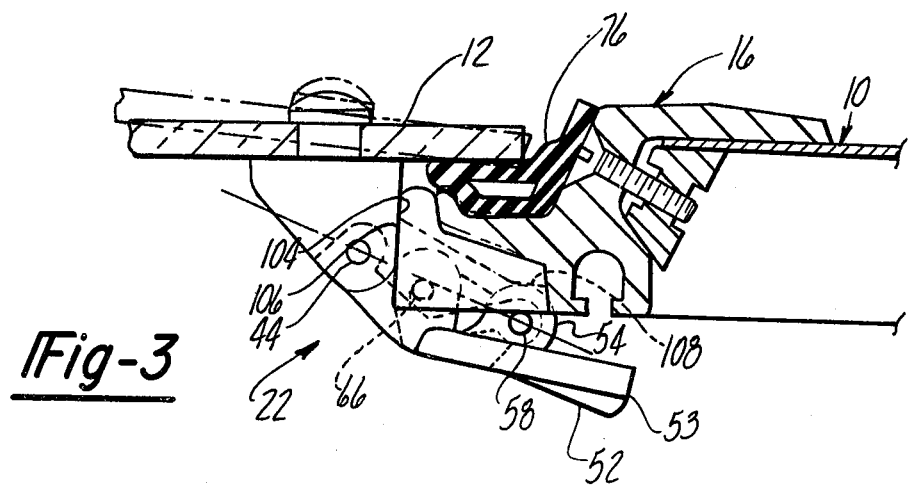
FIG. 3 is a view of the section shown in FIG. 2 with the latch-hinge in the latched position compressing the sunroof panel against the seal.

The pedestal block 26 is formed with a surface 104 which corresponds and meets with a surface 106 formed on the rear face of the catch block 70 such that the downward pull of the angle link 48 is exerted upon the rotational movement of the lever handle 52 such as to cause a latching of the sunroof panel 12 converted into a straight downward pull by virtue of the engagement of faces 104 and 106. These faces 104 and 106 which extend approximately vertically or normally to the opening 14 also provide a lateral location of the sunroof panel 12 within the opening 14 by virtue of the catch block 70 being laterally located against the generally downwardly extending face 82 and the lip 80 formed on the frame 16. The angle link 48 and the lever handle 52 comprise an over-center linkage which acts to exert a downward pull on the sunroof panel 12 when the pivot pin 66 is positioned within the recess 68 and the lever handle 52 rotated counter-clockwise as seen in FIG. 2, drawing the pedestal block 26 and the sunroof panel 12 downward into the latched position shown in FIG. 3. In the latched position, the pivot pins 44 and 58 have passed into a position relative to pivot pin 66 such as to over-center so that the reactive forces to compression of the seal 76 act on these pins in such a manner as to produce a counter-clockwise movement on the lever handle 52 about the pivot pin 66 to lock the lever handle in that position. These forces by virtue of interengagement of faces 104 and 106 are converted into a straight downward pull which causes the panel 12 to tightly compress the seal 76 and retain it in this compressed state. The clevis ears 54 in this position abut a surface 108 formed in the recess 84 as shown in FIG. 3 to provide stop means to locate the lever handle 52 in the latched position. The lever handle 52 is formed with a handle portion 53 which is formed with a relief scallop 57, the handle portion 53 projecting slightly downwardly in the latched position so as to provide easy gripping to release the lever handle 52 when desired.

This arrangement thus provides a positive sealing engagement of the sunroof panel 12 in the region of the front edge of the sunroof panel which is a substantial improvement over the bayonet-hinge type arrangements which adequate compression of the seal cannot be insured, particularly if the bayonet tangs have been deformed during handling.

To release the latch hinges 22, the lever handle 52 is rotated clockwise releasing the over-center relationship and the clevis ears 54 are moved entirely out of the catch pivot recesses 68 as the angle link 48 is rotated about its pivot 44 to clear the lever handle 52 into the interior of the opening 14, and the sunroof panel 12 lifted clear of the opening 14, the rear latch handle mechanism 18 having been previously detached to completely free the sunroof panel 12.

Figure 4:
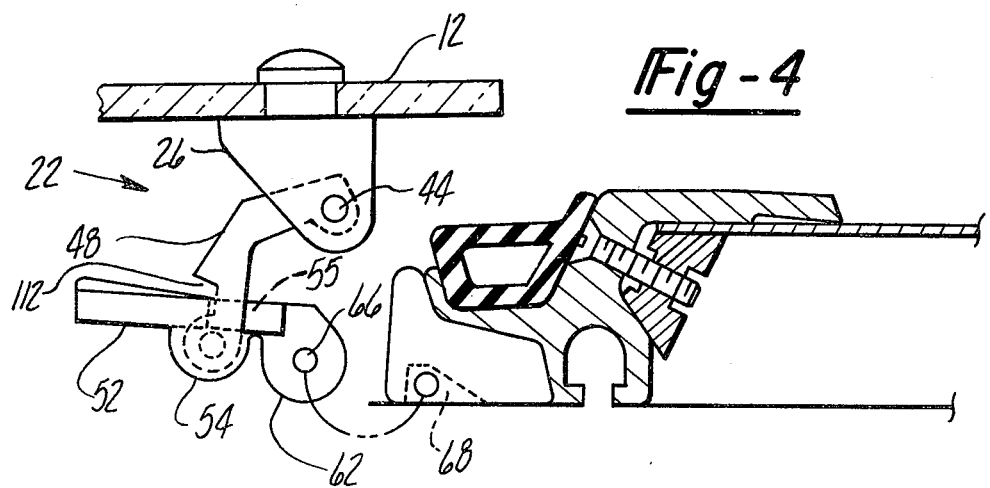
FIG. 4 is a view of the section shown in FIG. 2 with the latch-handle in the pop-up or vent position depicting the deflection of the latch-hinge in phantom lines.

The angle link 48 is formed in a general angular shape to accommodate the pivot pin 66 as shown in FIG. 3, when the lever handle 52 is moved to the locked position and also acts in cooperation with the pivot pin 66 to provide limit means maintaining the lever handle 52 and the angle link in the approximate correct position ready for repositioning of the pivot pin 66 back into the recess 68 in the proper relationship. This is accomplished by the pivot pin 66 preventing relative rotation counter-clockwise as shown in FIG. 4 of the angle link and the lever handle 52 to allow the angle link 48 to pass completely between the slot 55 formed intermediate the clevis ears 54 and 62, which slot is configured to accommodate the normal range of relative rotation between the angle link 48 and the lever handle 52 during latching and unlatching of each of the latch hinges 22. In addition, the angle link 48 is notched at 112 to accommodate this same degree of rotation and which also acts in conjunction with the slot 55 to limit the relative rotation between the angle link 48 and the lever handle 52 to that required to latch and unlatch and likewise prevent mispositioning of the angle link and the lever handle 52 beyond this position. Thus, upon the repositioning of the sunroof panel 12 within the opening 14, the lever handle 52 will extend at the approximately correct angle, ready to be swung into position with the pivot pin 66 within the recess 68 to simplify use, minimizing any confusion which might occur if the components could rotate out of the proper relationship with each other.

Figure 8:
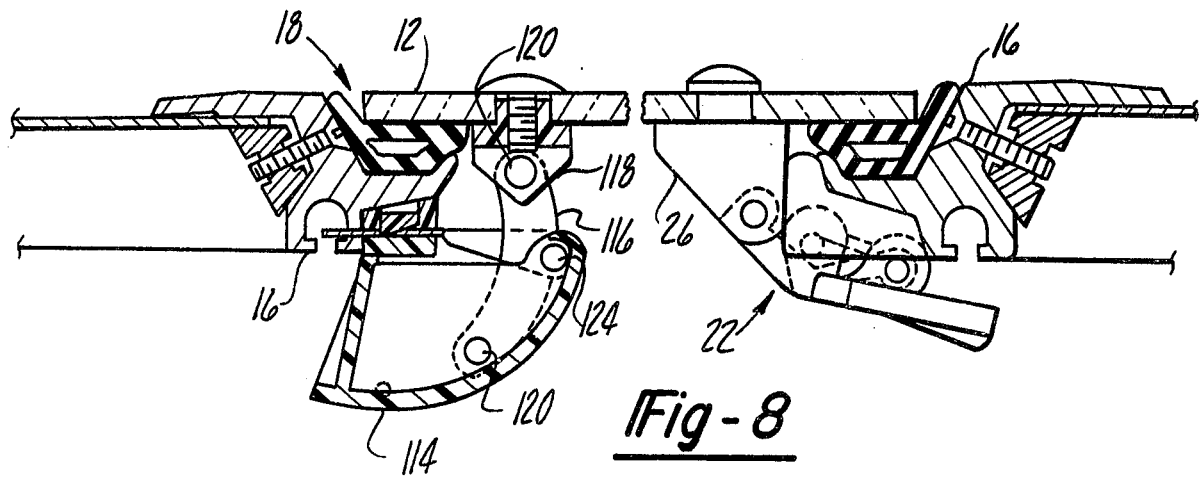
FIG. 8 is a sectional view through the entire sunroof panel depicting the frontal latch-hinge and the rear latch-handle.

FIG. 8 shows in section both the rear latch hinge 22 and the latch handle mechanism 18 in section in the latched position.

The latch handle mechanism includes a handle 114 and a link 116 pinned to an anchor block 118 and secured to the sunroof panel 12 in similar fashion to the pedestal block 26 of the latch hinge 22. This arrangement likewise acts as an over-center linkage by the pivot points 120 and 122 connecting a link to the sunroof panel 12 and to the handle 114 to the frame structure 16 to provide a mechanical advantage and producing a downward force and also a locking or self-maintaining position once the handle 114 has been moved to that position.

Details of the latch handle mechanism 18 are not here included since they are fully described in the above copening patent application and since the details thereof do not constitute the present invention.

Figure 9:
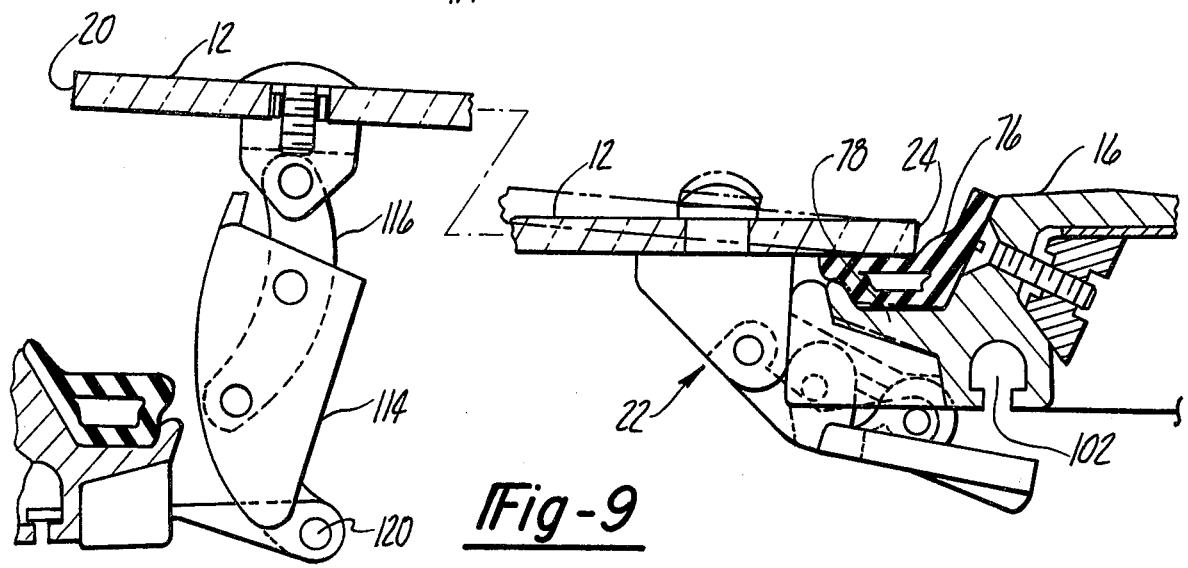
FIG. 9 is a sectional view through the frontal area of the sunroof panel depicting the latch-hinge in the released position as the sunroof panel is being depicted.

FIG. 9 shows the relationship of the sunroof panel 12 upon movement of the handle 114 to the pop-up or vent position. In this position, the rear edge 20 of the sunroof panel 12 has been elevated a few inches by the rotation of the handle 114 to the position shown in FIG. 9. According to the present invention, the hinging action is created by a deflection of the frame 16, particularly the lip section 78 which is further accommodated by the presence of the recess 102. The front edge 24 of the sunroof panel 12 rotates into the seal 76 and some compression or deflection or the various parts in the latch hinges 22 likewise accommodate the tilt of the sunroof panel 12. This deflection is created by bending and stretching of the various parts which is well within the range of elastic yield of the parts and acts as a resilient hinge action which produces a much more considerable downward biasing pressure than hinging arrangements as have been utilized heretofore to produce a tight positioning of the sunroof panel 12 in the pop-up position shown in FIG. 9. It can thus be seen that the objects of the present invention have been provided in a relatively simple manner and insure very good compression of the seal 76 about the entire periphery of the opening 14 by the positive downward pressure exerted by the latch hinges 22 in conjunction with the sealing pressure exerted by the latch handle mechanism 18. At the same time, the hinging action involving deflection of the latch hinges 22 and frame 16 provides a three-point securement of the sunroof panel 12 in the pop-up position such as to eliminate rattles and bounce when the sunroof is in the vent position.

All of the components of the latch hinges 22 are preferably formed of molded plastic or hard rubber material so as to be able to be manufactured at relatively low cost while assuring adequate strength and aesthetic appeal appropriate for such components.

The embodiments of the invention in which an exclusive property or privilege is claimed are defined as follows:

1. A sunroof for a vehicle having an opening in its roof comprising:
    a frame extending about the periphery of said opening, said frame including a lip portion extending into said opening;
    a compressible seal disposed on the upper surface of said lip and extending about said periphery of said opening;
    a sunroof panel adapted to overlie said opening in engagement with said seal; detachable latch handle means mounted to a portion of said sunroof panel adjacent on edge of said sunroof panel and including a latch handle and means for latching said sunroof panel upon movement of said latch handle drawing said sun panel downwardly to compress said seal and further including means locking said latch handle in said latched position, said latch handle means also providing a vent position of said latch handle positioning said sunroof portion spaced upwardly from said opening and further including means releasing said latch handle means from said frame to allow detachment thereof of said sunroof panel;
    a plurality of latch hinge means associated with an opposite portion of said sunroof panel adjacent an opposite edge of said sunroof panel, each said latch hinge means including a lever handle and means drawing said portion of said sunroof panel down into compressive engagement with said seal upon movement of said lever handle to a latched position, said lip portion of said frame being sufficiently resilient to accommodate deflection thereof upon movement of said latch handle means to said vent position;
    said latch hinge means further including means allowing detachment of said latch hinge means from said frame whereby said sunroof panel may be released for removal thereof upon detachment of said latch handle means.

2. The sunroof according to claim 1 wherein each of the latch hinge means includes an overcenter linkage drivingly connected to said sunroof panel and said frame and operable of said lever handle to draw said sunroof panel portion into compressive engagement with said seal.

3. The sunroof according to claim 2 wherein each of said latch hinge means includes a pedestal block affixed to said sunroof panel and a catch block secured to said frame and wherein said latch hinge means includes means drawing corresponding surfaces of said pedestal block and catch block, respectively, into sliding engagement upon movement of said lever handle to the latched position.

4. The sunroof according to claim 3 wherein said corresponding surfaces extend in a generally vertical direction whereby said engagement of said corresponding surfaces provides a horizontal location of said sunroof panel with respect to said frame.

5. The sunroof according to claim 2 wherein said overcenter linkage comprises a pedestal block mounted to one of said sunroof panels or said frame;
    a link pivotally mounted at one end to said pedestal block;
    a catch block mounted to the other end of said sunroof panel on said frame, said catch block formed with a pivot recess extending into said catch block;
    a lever handle pivotally mounted to the other end of said link from said one end;
    a pivot pin removably locatable within said pivot recess formed in said catch block by movement of said lever handle on said pivotal mount to said link and said movement of said link on said pivotal mounting on said pedestal block;
    a handle portion formed on said handle lever adapted to rotate said lever handle about said pivot pin with said pivot pin disposed in said pivot recess to draw said pedestal block toward said catch block by rotation on said link, said pivot handle being rotatable therein until the center line of said pivotal mount between said link and said lever handle passes over center of said pivotal mounting of said one end of said link to said pedestal block;
    stop means locating said lever handle in said position overcenter with said pivotal mounting overcenter whereby said pedestal block and said catch block are drawn into said corresponding position and latched in said overcenter position.

6. The sunroof according to claim 5 wherein each of said pedestal blocks and said catch blocks are formed with engaging faces brought into sliding engagement by movement of said lever handle to said latching position whereby said pull exerted by said link is guided along the direction of said sliding engagement.

7. The sunroof according to claim 5 wherein said link and said lever handle are formed with surfaces limiting relative rotation therebetween such as to dispose said lever handle in position to be engaged with said pivot recess.

8. The sunroof according to claim 7 wherein said means includes clevis ears formed on said lever handle and a pivot pin, said pivot pin extending through said clevis ears and wherein said link extends through said lever handle into a slot formed in alignment with the space between said clevis ears and wherein said link is angled to accommodate said pivot pin upon movement of said lever handle to said latched position and the rotation of said link towards said pivot pin during movement of said pivot pin in said pivot recess.

9. The sunroof according to claim 5 wherein said stop means comprises a surface formed within a recess formed through said catch block which is adapted to receive a portion of said lever handle upon rotation about said lever handle about said pivot recess into a latched position, said recess surface engaging a portion of said lever handle upon rotation thereof into said overcenter position.

* * * * *